United States Patent [19]

Lönnroth

[11] 4,149,410
[45] Apr. 17, 1979

[54] METHOD OF NAVIGATION FOR SAILING BOATS

[75] Inventor: Jonas Lönnroth, Stockholm, Sweden

[73] Assignee: AB Instrument Verken, Sweden

[21] Appl. No.: 863,055

[22] Filed: Dec. 21, 1977

[30] Foreign Application Priority Data

Dec. 23, 1976 [SE] Sweden ................................ 7614510

[51] Int. Cl.² .............................................. G01C 21/20
[52] U.S. Cl. ............................ 73/178 R; 116/DIG. 43
[58] Field of Search ...................... 33/355R, 263, 349;
116/DIG. 43; 73/188, 180, 178 R

[56] References Cited

U.S. PATENT DOCUMENTS

| | | | |
|---|---|---|---|
| 2,303,990 | 12/1942 | Dietz | 33/349 |
| 2,560,590 | 7/1951 | Ocker | 33/349 X |
| 3,678,591 | 7/1972 | Selig, Jr. | 33/355 X |
| 3,804,057 | 4/1974 | Toscan | 33/349 X |
| 3,824,947 | 7/1974 | Honkaranta et al. | 33/349 X |

*Primary Examiner*—Jerry W. Myracle
*Attorney, Agent, or Firm*—Stevens, Davis, Miller & Mosher

[57] ABSTRACT

A method and a device for facilitating the determination of wind direction and the position of a sailing vessel on a racing course. One and the same geographical bearing determined by the wind direction can be read on both tacks. The same graduation number may be watched on both tacks and this number refers to the wind direction.

4 Claims, 2 Drawing Figures

METHOD OF NAVIGATION FOR SAILING BOATS

FIELD OF INVENTION

This invention relates generally to instrumentation, and more particularly to a method and a device facilitating the determination of wind direction and boat position on a racing course.

The invention comprises a method by which in a sailing vessel one and the same geographical bearing determined by the wind direction can be read on both tacks and a compass device for performing this method. The same graduation number can be seen on both tacks and this number refers to the wind direction. Generally it is preferable to observe the wind direction in degrees but in some application it may be better to use scales that have other graduations. This will be explained in the following text.

SUMMARY OF THE INVENTION

The present invention relates to a method by which, in a sailing boat, the same geographical bearing, determined by the wind direction, can be read on both tacks and a compass device for performing this method.

In sail racing it is important to be able to follow the variations in the direction of the wind, so that the tacks that lead fastest to the destination points can be chosen. Among sail racers, the compass is used for this purpose. To facilitate this, a method has been invented by which a conventional compass rose can be divided into two mutually displaced scales. Thus, one and the same geographical bearing which is determined by the wind direction can be read on starboard as well as on port tack if the reading is done at lubber lines intended for the actual tacking angle. Each scale is attributed to one tack and has its own lubber lines, although combinations of scales and lubber lines have been developed in embodiments of the invention. The geographical bearing determined by the wind direction can be read unchanged while sailing on different tacks upwind or downwind under the condition that the tacking (or gybing) angles are known, lubber lines intended for these angles are provided and the wind direction remains constant.

Important aspects of the present invention are that the compass can be viewed from convenient observation points and that no adjustments have to be made.

DEFINITIONS AND DESCRIPTION OF PRIOR ART

In said racing, the principles for using the compass to ascertain the closest tack to the mark have been known for a long time. This is based upon the fact that the beating angle (the angle between the longitudinal direction of the boat and the wind direction) when sailing an optimum course to windward varies within a narrow range which is well known for different types of boats.

In certain boats there is also an optimum course for reaching downwind which gives an optimum reaching angle between the direction of the boat and the wind direction. The angle between the directions of the boat while beating to windward is defined as the tacking angle and corresponds to twice the amount of the beating angle. The angle between the reaching courses would be the gybing angle. The wind direction bisects the tacking (and gybing) angle.

Special compasses equipped for this purpose have been described in the U.S. Pat. No. 3,678,591, the Swedish patent application 9251/72 and the book Wind and Strategy, p. 23-32, Norton & Co, New York 1973 by Dr Stuart Walker. Such a compass should meet certain specific demands. The information obtained by viewing the compass should be easily comprehensible and lead to a proper decision as to which tack to choose with a minimum of deliberation. The information obtained should also be easy to memorize for reference. A most important prerequisite is that the viewing shall be possible from normal observation points so that the observer does not have to move around to look at the instrument. Such observation points are located within reading sectors, usually one on each side of the boat. The reading sectors have vertical and horizontal dimensions. The acute angle between the viewing direction and the longitudinal direction of the boat is defined as the reading angle. The compass device should have good mechanical characteristics, be unaffected by to heeling and have good dampening so that erratic motion does not occur. The readability of the instrument should not be impaired by lens effects caused by water droplets on the transparent compass housing.

By using the methods of prior art these demands have not been successfully incorporated simultaneously in one instrument. This is so in spite of strong demands for such products among manufacturers and sailors as well. In compromising with these demands, development has taken place along two separate lines described below.

When good mechanical qualities and good readability have been considered important the capsular (globe) compass has often been chosen. With auxiliary lubber lines in addition to the customary fore and aft lubber lines at $+/-45$ degrees from the forward lubber line (see U.S. Pat. No. 3,690,014) viewing the compass is simplified since the reading sector then coincides with the usual reading sector which is obliquely backward in the boat with the observer hanging out to windward. The transparent compass globe magnifies the graduation numbers so that the compass can be read at a distance which is often necessary for maximum stability when the compass is located in the center of motion of the boat.

The possible vertical extension of the reading sector is almost 90 degrees, viz. from viewing the compass from above (by using lubber lines that are bent in over the compass card) to close to horizontal level (by refraction in the compass globe). It is important that the compass can be read close to the horizontal plane because in modern sailing hanging out from the boat to windward, by using foot straps or trapeze harnesses, is necessary often.

However, a considerable amount of practice is needed in the psychologically tense racing situations in order that the sailor shall be able to register and mentally process course variations within the two separate ranges that are the result of using the technique outlined here. Sailing "low" on one tack corresponds to sailing "high" on the other and while sorting this out, attention is diverted from other sailing functions, such as keeping up boat speed.

In order to make the use of the compass for tactics easier and thus available to a greater number of sail racers another line of compasses was developed, so called "tactical compasses".

The compasses described in U.S. Pat. No. 3,678,591 and in Swedish patent applications Nos. 9251/72 and 74 10879-6 belong to this group. The basic idea is the presumption that the wind varies around a median wind direction. It is an accepted sailing principle that tacks should be performed when the wind passes its median direction. However, it is rarely mentioned that this only refers to the future median value during the remainder of the leg sailed.

When using a compass as described in Swedish Patent application No. 74 10879-6 the median wind direction has to be determined before the race starts. When this has been performed, an adjustable device (the entire compass housing with lubber lines inscribed on it) is set so that the passage of the median wind direction is signalled by the indication of sectors of different colors on the compass card. In the usual embodiment a red sector seen at the appropriate lubber line signifies that the opposite tack is more advantageous and hence that after tacking a green sector will be indicated.

Experience shows that this method has several conspicous and severe shortcomings. In the horizontal plane, there is no defined reading sector. To observe the compass, one must look at it more or less from above. When using the capsular (globe) compass version described in the U.S. Pat. No. 3,678,591 one has to follow the compass card around the compass in order to see the sector on the compass card and the lubber lines properly. A useful reading sector is only present for about a quarter of the entire circumference. In other ranges, the direction of view while sitting out to windward is either tangential to the compass card at the lubber line or the compass is viewed from "the wrong side".

In order to provide a capsular (globe) compass with a colored card sector system as well as a pretermined reading sector the card would have to be adjustable in relation to the magnet which would be highly impractical and such a compass would be expensive to manufacture.

As a matter of fact, the invention described in the Swedish patent application No. 74 10879-6 is to be regarded as a development of the invention described in the U.S. Pat. No. 3,678,591. In order to overcome some of the reading difficulties a generally flat compass has been used. However, this compromise is accompanied by the shortcomings inherent in this type of compasses, such as less magnification of graduation numbers, less oscillation dampening and a greater susceptibility to limitations of heel. Using external gimbaling does not remedy these shortcomings.

The difficulty of determining and presetting the median wind direction should not be underestimated. While racing, the wind shift pattern is often lost and, consequently, considerable attention has to be paid to checking the median value so that the compass may be readjusted accordingly.

In none of the known methods described above enough consideration is made to the fact that "the beating angle varies within certain limits, well known for various types of boats". The auxiliary lubber lines of the conventional capsular compass as well as the lubber lines of the "tactical compass" are set up for a fixed tacking angle, usually of 90 degrees. Compensating for variations in the beating angle is very difficult. Since tacks are often made on the basis of wind shifts as small as 5 degrees and less it is well understood that a change in the beating angle of $2\frac{1}{2}$ degrees (which corresponds to a change in the tacking angle of 5 degrees) easily leads to erroneous decisions.

To meet this need for adjustability a slightly more sophisticated version of the tactical compass was designed (see Swedish patent application No. 9251/72) in which the lubber lines are adjustable on top of the compass housing. This allows compensation for changing tacking angles. However, the other shortcomings are by no means eliminated. Reading such a compass is even more difficult because of parallax and refraction phenomena. It is questionable if adding further components that have to be adjusted while racing is an improvement. Determining the tacking angle is often as difficult as locating the direction of the wind.

On the theoretical level, there are other objections against the method of using an assumed median wind direction. The variation of the wind direction is a most complex matter in which oscillations created by wave motions in the atmosphere are added to numerous other effects. The phase velocity of these waves varies due to the Doppler effect when sailing upwind or downwind. Often there is a considerable base line shift due to the Coriolis effect in the sea breeze. Clouds passing over the racing course bring with them their own systems of circulation influencing upon the wind direction at the water surface. The topography of the surroundings also exerts its influence of the wind direction (see the article "Wind, Water and Clouds" in Modern Boating, Dec. 1974, Australia, by Frank Bethwaite and the volume "Waves in the atmosphere" in Developments in Atmospheric Sciences 2, American Elsevier Publ. Co, New York 1975, by Gossard, Hooke).

It is therefore questioned, whether the principle of "automatic indication of the preferred tack" does not in reality decrease the possibility of discerning the various factors that influence the wind direction. To rely on a preset value, set before the start or readjusted now and then is an oversimplification.

For the reasons given above, direct numerical indication of the wind direction is highly desirable. This allows for a better understanding of the racing scene. However the compass should also meet the other demands mentioned. Observering a lubber line through a globe compass from behind gives as a result two graduation ranges that have to be correlated, which is difficult. Observing the compass from windward, having the lubber line between the compass card and the observer gives the wind direction (if the tacking angle corresponds to the location of the lubber lines) but then the direction of view is tangential to the compass card at the lubber line if the observation is made from the normal observation point which demands that the compass could be seen easily while still keeping the waves ahead of the boat within the scope of vision. If observation of the compass is made without keeping track of the waves ahead, boat speed is impaired.

The reference bars in the U.S. Pat. No. 3,678,591 have to be sighted along from leeward, disturbs the view of the card from the most useful reading sector (obliquely from behind on the windward side of the boat) and is therefore useless in modern racing dingies. The relative position indicator as a concept was described previously in the book Taktik des Regattasegelns, part 1.31 (relative position lines), author Joachim Schult.

SUMMARY OF THE INVENTION

It is the purpose of the present invention to overcome the disadvantages inherent in earlier efforts to adapt the compass for sail racing. According to the invention a conventional compass scale is divided into at least two mutually displaced scales. The displacement is preferably made symmetrical to the original scale. One and the same geographical bearing which is determined by the wind direction can be read on starboard as well as on port tack provided that the reading is done at lubber lines attributed to the actual tacking angle. Each scale pertains to one tack and has its own lubber lines even if in various embodiments of the invention, combinations of scales and/or lubber lines have been made. The bearing determined by the wind direction can be read unchanged while sailing upwind (beating) as well as when sailing downwind (reaching) if the tacking and gybing angles are known and the wind direction has not shifted. Other, likewise fixed lubber lines are utilized to indicate the bearings of the reaching legs on the olympic course by substituting the bearing of the first leg (as given by the Race Committee prior to the race) for the actual wind direction.

In conclusion, by using the invention it is possible to register the variations of the wind direction almost continuously without having to make any physical adjustments. Furthermore, this is done by viewing the compass from the most advantageous reading sectors. All the advantages of the capsular compass can be gained. Even if the sailor's attention to the compass is diverted, this is not too detrimental since the reading can be continued at any moment and the findings correlated to the present situation on the racing course.

The scale arrangements described below can be divided into two basic groups, viz. complete 360 degree scales, one for each tack, and single scales derived from the first group by combinations of the graduation number series in the double scales so as to obtain symmetrical sectors containing the same series of graduation numbers.

As the double scale arrangement forms the principal basis for performing the method of the invention it will be described first.

In the following description v is assumed to be the angle between the wind direction and the longitudinal centerline D of the boat. The geographical being determined by the wind direction is indicated as V on the compass rose or disc K.

Figure 1:
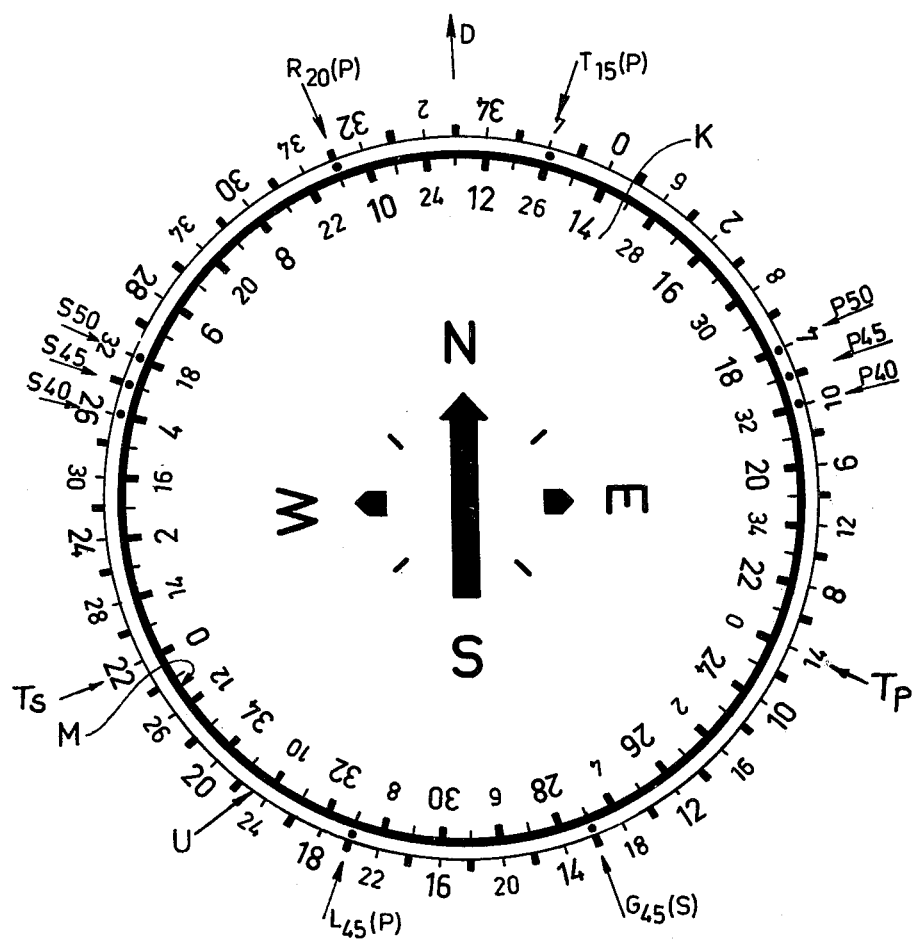
FIG. 1 is a top view of a compass disc or card on which several possible embodiments of the scales and of the positions of the lubber lines are shown.
Figure 2:
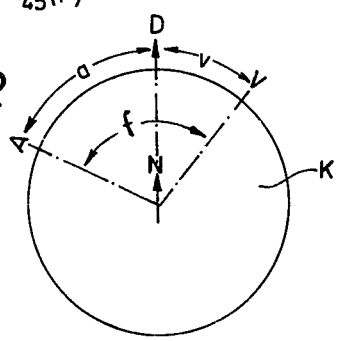
FIG. 2 is a schematic top view giving the principles for the displacement of the scales.

On a compass rose (FIG. 2) the bearing (towards) V is desired to be indicated at A. The choice of the position A is made so as to obtain good readability. To achieve this, the compass scale can be displaced so that the graduation number at V will instead be indicated at A. The angle a between the longitudinal centerline D and the radius at the position A is defined as the reading or indication angle. The angle v between the bearing V and the longitudinal centerline D is defined as the beating angle, twice the amount of which is the tacking angle. Beating angle should be understood as the optimum angle for sailing upwind or downwind, since in some boats it is advantageous to tack downwind also. Tacking angle thus comprises the angle between tacks when sailing to windward as well as when reaching downwind and tacks are changed by gybing.

The magnitude of the rotational displacement (f) is determined by the relationship $$f = a + v$$

Having changed tacks, and sailing on the other tack, a graduation number which does not correspond to V will be seen at the lubber line intended for this tack. A displaced scale is inserted for this tack as well and the relationship between this scale and the original rose scale will amount to (in absolute numbers)

$$|f| = a + v.$$

The amount of rotational displacement between the two scales will be:

$$2f = 2(a+v)$$

Hence, it follows that the same amount of scale displacement can be used at different values of v by changing the amount of a so as to satisfy the equation. The following relationship also exists:
1. If v is held constant but f is varied a must be changed as well
2. If f is held constant changes in v have to be counteracted by changes in a
3. If a is held constant changes in v will influence f.

The first case signifies that the scale displacement can be adjusted so as to obtain a desired mutual relationship between the locations of the respective series of graduation numbers. If, for example, indication of every twentieth degree is desired the graduation numbers could coincide on the same locations, thus confusing the view of the card. Here one is presented with the possibility of combining the scales into one scale with symmetrical sections as described below. Another possibility is to adjust f 5 degrees in either direction and to let a follow, likewise with 5 degrees, so that the graduation numbers of one series occupy the gaps in the other series.

The second case signifies that there should be a possibility to compensate for small variations in v by using additional lubber lines. There is a direct relationship between the amount of the variation of v and the necessary number of degrees that a has to be displaced (so that the equation is still satisfied) in order to maintain f constant. This makes it possible to easily compensate for variations in v and to determine the tacking angle when unknown by using auxiliary lubber lines as in the described embodiment of the invention.

Finally, if a is not adjusted when v varies, i.e. no extra lubber lines are added, extrapolations have to be made.

The relationship $2f = 2(a+v)$ is valid also for band scales (applicated to annular vertical skirts of the compass disc) but in this case, the angles are measured from the rear fore and aft lubber line (from behind).

If adjustable lubber lines are wanted instead of combinations of auxiliary lines various device that can be remotely controlled may be used, such as simple hydraulic systems.

For discerning and separating the scales (in the non-symmetrical embodiments) various optical methods could be used, such as differences in color, polarization or by using one compass for each tack and scale.

If direct indication of the wind direction is desired, the full 360 degree scale should be used in the scale arrangements. This gives the advantage of greatly enhanced spatial orientation by using the same frames of reference for the compass, the wind, the horizon and the course bearings given by the Racing Committee.

However, other scales could be used as well, such as the "New degree" (0–400) scale or derivates thereof.

In order to find symmetrical solutions for sectorial scale arrangements the following assumption are made:

Assume that a is the absolute value of the reading angle.

2 v is the tacking angle.

S is the number of sectors on the compass card.

Consequently, S must be a integral number amounting to 2 or more. In order for identical graduation numbers to be indicated after tacking the angle between these numbers can be seen from $$2fS = 360$$

$$S(2a+2v) = 360$$

Assume that the tacking angle is approximated to 90 degrees.

For S equal to 2 then:

$$2a + 90 = 180$$

$$a = 45$$

For S equal to 3 then:
$$2a + 90 = 120$$

$$a = 15$$

For S equal to 4 then:
$$2a + 90 = 90$$

$$a = 0$$

In certain types of boats it would be more appropriate to approximate the tacking angle to 40 degrees, hence $2v = 80$.

Using the same method of solution as before the following results are obtained:

$$S = 2; a = 50$$

$$S = 3; a = 20$$

$$S = 4; a = 5$$

For $a = 0$ there is no integral number of S.

Evidently, by this alternative nothing is added to the solutions using 90 degrees for the tacking angle since the same results could be obtained in the first alternative by using additional lubber lines at $+/-5$ degrees from the lubber lines attributed to the design tacking angle.

Thus, the sum between the reading angle a and the beating angle f is held constant by purpose. This also relates to the nonsymmetrical scale embodiments of the invention. This explains why permanently displaced scales can be applied to the compass card in spite of variations in v.

However, the second alternative shows where lubber lines for other tacking angles than the design lubber line could be positioned.

In designing the band scale, the same method is used. Its graduation number can be indicated at positions corresponding to the numbers of the card scale. If other positions are desired for the lubber lines attributed to the band scale, the band scale could of course be rotated in relation to the card scale.

When designing a scale of symmetrical sectors, the scale for each tack is laid out. Two concentric series of graduation numbers will be obtained on a card scale. The graduation numbers of one series will be juxtapositioned to numbers in the other series. Of these corresponding numbers, the number of highest value is omitted. In those cases, in which redundant parts of the series are obtained ($S=3, S=4$) these parts are given the same series of low graduation numbers that remain in the sectors already made up. Thus, a scale comprising 2, 3 or 4 identical sectors containing the same series of graduation numbers is achieved. The position of the lubber lines is found from the solutions given above.

Arbitrary graduation numbers referring to other subdivisions of the circle than 360 degrees may be used in the symmetrical sector embodiments of the invention as well.

Using symmetrical sector scales does not allow direct indication of all wind directions in actual bearings. However, under certain conditions the greater readability possible with this scale could counterbalance this disadvantage. The method described below for determining the tacking angle when unknown can still be used.

The embodiments of the invention described below use the invented method of indicating bearings determined by the wind direction and relate in particular to a preferred embodiment—or version—for olympic double-handed (for two persons, helmsman and crew) dingies and catamarans.

In the center of the compass rose, the actual direction to north is indicated as N, together with the directions of east, south and west indicated as E, S and W, respectively. The graduation numbers attributed to starboard tack are indicated by black, boldface numerals whereas the port scale uses thin numerals (in reality contrasting colors would be used for indicia).

The card (horizontal) scale M is shown as the inner scale and it is to be viewed diagonally through the compass from an observation point above the level of the scale. The optimum reading angle is considered to be 70 degrees in view of the positions of the crew in strong winds. The tacking angle varies between 80–100 degrees with an average of 90 degrees which is used for determining the scale separation which amounts to $2 \times 70 + 90 = 230$ degrees ($2f = 2a + 2v$).

However, the desirable horizontal reading sector in this type of boats is large due to the altered position of the crew when sailing in light winds. Then the point of observation is often close to and in front of the compass. By using the lubber lines attributed to the horizontal card scales also for band scales U intended for starboard and port tack, respectively, the reading sector can be extended forward considerably, while still maintaining or actually improving the desired extension of the vertical reading sector. The mutual displacement of the band scales at the tacking angle of 90 degrees and at the reading angle of 110 degrees (180–70, band scale angles measured from center line aft of compass) amounts to 310 degrees. It is advantageous to be able to read the wind direction on a band scale while viewing the compass from a close distance when sailing in light winds since this is easier than observing the card scale. Less disturbance is created by water droplets under calm conditions and when the viewing point is close to the compass.

When beating to windward with an optimum angle between the longitudinal direction of the boat and the wind of 45 degrees, the wind direction when sailing on starboard tack is read at the starboard lubber line $S_{45}$ which is positioned on port side and attached to the housing surrounding the compass disc K on the starboard card scale (boldface numerals on scale M). Using crew positions further forward in the boat, the wind direction is also presented by reading on the starboard band scale (boldface numerals on scale U) at the port windward card scale lubber line $P_{45}$ which is likewise permanently attached to the housing surrounding the compass disc K.

When beating to windward at 40 or 50 degrees to the wind the card scale is read at lubber lines $S_{40}$ or $S_{50}$ respectively on starboard tack and at lubber lines $P_{40}$ or $P_{50}$ respectively on port tack. The band scales could also be used for other tacking angles than 90 degrees. Thus, when sailing on starboard tack at 50 degrees to the wind, the wind direction is indicated by reading the starboard band scale (boldface numerals on U) at the port lubber line $P_{40}$. For the lubber lines, 50 on the card scale corresponds to 40 on the band scale and vice versa—angle a is measured from the front for card scale and from the back for band scale.

In determining a previously unknown tacking angle a hypothetical value is used, preferably smaller than the probable tacking angle. After tacking a discrepancy between the indications occurs, half the amount of which is added to a and v which gives the correct magnitude of a and v. It is conceivable that interpolations have to be made between the adjacent lubber lines which is easy due to the small distance between them. The wind directions is the median value of the two indications.

If, i.e. the hypothetical beating angle is 40 degrees, the wind direction read at $S_{40}$ is indicated as 210. After tacking to port, reading at $P_{40}$ the wind direction is indicated as to be 220 degrees. The difference obtained as 10 degrees, half of which is 5 degrees. Thus, the boat is sailing at 45 degrees to the wind and the actual wind direction is 215 degrees. If the reading on port is smaller than the reading on starboard, the hypothetical beating angle is larger than the actual one, and consequently, half the difference between the readings should be subtracted from a and v. The wind direction is assumed to be constant throughout the tack.

Another advantage of the invention will be evident when sailing downwind. The reaching legs of the conventional olympic racing course are normal to the windward tacks (assuming a tacking angle of 90 degrees). By attaching permanently fixed lubber lines on the immobile compass housing at 90 degrees abaft of $S_{45}$ and $P_{45}$ respectively, permanent indicia are obtained for the reaching courses.

Assume, for instance, that the wind direction as indicated while sailing to the windward mark, approaching it on starboard tack, was 310 degrees but the bearing to the windward mark (used for laying the legs of the course) given by the race committee was only 290 degrees. When turning around the windward mark, the course design wind direction is substituted for the actual wind direction and the helmsman bears away until 290 degrees is indicated on the starboard band scale at the lubber line $G_{45}$ signifying the correct course to the gybing mark on a course having the 90–45–45 angles of the olympic triangular course.

After having changed to port tack at the gybing mark the helmsman steers so that 290 degrees is indicated on the port band scale at lubber line $L_{45}$ attributed to the reach on port towards the leeward mark.

While reaching downwind, the position of the crew is usually abaft of the position occupied while sailing to windward. Thus, the reading sector employed while reaching is usually directed more to the rear than the reading angle used while sailing to windward. Consequently, a more acute reading angle through lubber lines $G_{45}$ and $L_{45}$ respectively seldom constitutes any disadvantage. Other optional, more forward positions of lubber lines for the reaching legs could be used in this embodiment, such as 65 degrees from front or 70 degrees from the rear.

By using these principles for establishing the correct courses to the gybing and leeward marks, these marks are easily found even in conditions of low visibility. When turning the leeward mark the appropriate windward lubber line is again observed for the actual wind direction. During the entire course, no physical adjustments need to be done.

In using devices pertaining to prior art, such as the compasses described in Swedish patent application Nos. 74 10879-6 and 9251/72, which are denoted tactical compasses, for the purpose of establishing the courses of the reaching legs, the actual housing of the compass has to be rotated from the preset median wind direction so as to coincide with the fictional wind direction of 290 degrees. Exercising such maneuvers in tight situations such as mark roundings is hardly done, not the least in view of the frequent difficulty of actually maintaining observation of the compass card while hanging out. Those who use conventional compasses should calculate and note down the actual geographical bearings of the reaching legs prior to the start.

The olympic catamaran has an optimum reaching angle of approximately 135 degrees from the wind, thus coinciding with the reaching courses of the 45–90–45 degree olympic triangle. Using the lubber lines G and L while reaching on starboard and port respectively, the sailor is presented with the opportunity to continue reading, exploiting and keeping track of wind shifts without having to cope with other bearings than the actual wind direction, also when tacking downwind. In doing so, the boat is sailed at an optimal course in relation to the wind while reading the graduation numbers on the band scale at G and L respectively.

When on the run directly before the wind, the actual wind direction can be read at an auxiliary lubber line $R_{20}$. In the described embodiment this lubber line is positioned 20 degrees to port of the longitudinal center line D of the boat and the reading is done on the port card scale. Dingy sailors using the technique of sailing slightly higher than dead before the wind to improve their speed are thus able to determine if the course sailed coincides with the assumed actual wind direction.

To establish the true course sailed, additional auxiliary lubber lines can be used. By positioning a fixed permanent lubber line $T_{15}$ at 15 degrees to starboard of the longitudinal center line D, and adding 100 degrees to the value read on the port card scale at $T_{15}$ the true course is obtained.

The true course is also indicated by reading the appropriate card scale at permanent lubber lines $T_S$ and $T_P$ respectively (45 degrees abaft of $S_{45}$ and $P_{45}$).

What is claimed is:

1. A method by which in a sailing vessel one and the same geographical bearing determined by the wind direction is read on both tacks when sailing to windward, comprising, in one or several compasses, the use of two scales which are permanently displaced in relation to each other so that the displacement between the scales amounts to the sum of an assumed angle between the courses sailed while beating on each tack and the angle between lubber lines pertaining to said assumed angle between the courses sailed while beating to windward positioned on each side of the compass, so that when on one tack, reading the scale pertaining to this tack at the lubber line pertaining to this tack, the same bearing is indicated as will appear after tacking when reading the scale pertaining to this other tack at the lubber line pertaining to this other tack, provided that the sum of the actual angles between the wind direction and the respective courses sailed while beating to windward on each tack (the beating angle) is equal to the assumed angle between the courses sailed while beating to windward (the tacking angle) and that the wind direction is the same at both readings.

2. A method according to claim 1, wherein auxiliary lubber lines are positioned at known distances from and on each side of said lubber lines pertaining to each tack and a specific beating angle, wherein, assuming an hypothetical beating angle in accordance with the position of said auxiliary lubber lines, after changing tack, a difference can arise between the bearings indicated on the scale pertaining to each respective tack at said auxiliary lubber line pertaining to each respective tack, so that the actual beating angle is obtained by adding—if the reading on port is greater than on starboard (being positioned immediately clockwise to the other in a series of graduation numbers)—half the difference to the hypothetical beating angle, or by subtracting—if the reading on starboard is greater than on port—half the difference from the hypothetical tacking angle, after which the actual bearing determined by the wind direction, which is assumed to remain constant during the readings, is read at the lubber line pertaining to the actual beating angle and the tack sailed, but if no such lubber line exists the bearing is read at a point which is obtained by intra- or extrapolating in relation to said lubber lines on the scale pertaining to the tack sailed.

3. Method according to claim 1, in which additional lubber lines are used pertaining to starboard and port tack respectively, said lubber lines being permanently positioned in relation to the angle between a line through said lubber lines to the rotation center of the compass disc and the longitudinal centerline of the boat in addition to which said angle corresponds to the optimum course of the sailing vessel from the wind direction in order to achieve the highest speed possible when sailing downwind, added to—when using band scales—half the amount of the displacement between the scales or minus half the amount of the displacement—when using card scales—between the scales, implying that when sailing along said optimum course, identical bearings determined by the wind direction can be read when sailing on starboard as well as on port tack on the scales pertaining to each respective tack at the lubber lines pertaining to each respective tack, hence it is concluded that the indicated bearing determined by the wind direction while sailing downwind is the same as the bearing indicated while beating to windward regardless of tack sailed, provided that the wind direction is unchanged between the readings.

4. Method according to claim 1, comprising the use of additional lubber lines pertaining to starboard and port tack respectively, said lubber lines being permanently positioned in relation to the angle between a line drawn through a lubber line to the rotation center of the compass disc and the longitudinal center line of the boat, said angle being equal to the angle between a specific course in relation to the wind direction pertaining to said lubber line either minus half the amount of the displacement (card scale) or plus half the amount of the displacement (band scales) between the scales, so that the indication of a bearing on the scale pertaining to the tack sailed at said additional lubber line pertaining to said tack implies that the longitudinal centerline of the boat coincides with the course specified.

* * * * *